Nov. 11, 1930.  A. LÜTZOW  1,780,978
PROCESS FOR THE SECURING OF WELDS ON BENDED BODIES
Filed May 26, 1927
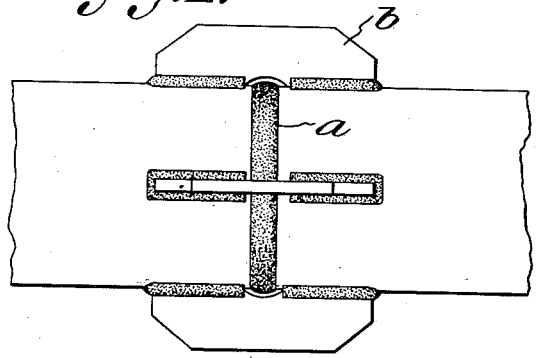
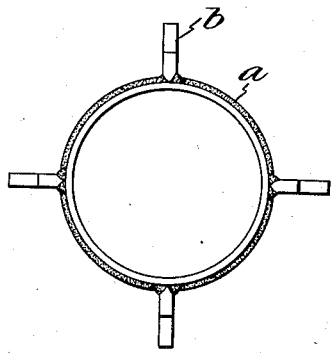
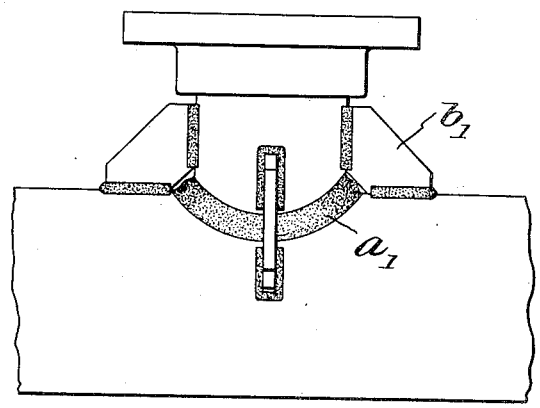
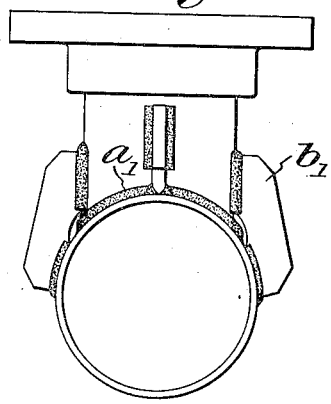

Patented Nov. 11, 1930

1,780,978

UNITED STATES PATENT OFFICE

ARTUR LÜTZOW, OF COLOGNE-MULHEIM, GERMANY, ASSIGNOR TO I. G. FARBENIN-DUSTRIE AKTIENGESELLSCHAFT, OF FRANKFORT-ON-THE-MAIN, GERMANY

PROCESS FOR THE SECURING OF WELDS ON BENDED BODIES

Application filed May 26, 1927, Serial No. 194,491, and in Germany May 27, 1926.

The present invention relates to a process for the securing of welds on bended bodies consisting in welding an appropriate number of cross pieces placed edgewise across the weld seam.

In order to avoid packed joints, the tendency at the present time is to replace flanges by welds. Since the execution of welds is always dependent on the reliability of the workman concerned, many propositions have already been put forward for the relieving of strengthening of the weld seams, in order to be able to utilize welded pipes, particularly steam pipes for very high pressures, without incurring danger. As the most important of these propositions may be mentioned the Swiss attempts at securing the welds by thin plates welded at right angles to the weld seam (see Zeitschrift des Vereins Deutscher Ingenieure 1926, vol. 6, pages 194/6.) However, these welded plates do not offer sufficient security when the weld is required to be bent as is particularly necessary in the case of pipes. Besides they have the disadvantage that the weld under the plate requires a particularly careful finish so as to render possible a smooth superposition of the plate. For the same reason the plate itself also requires a careful and costly adjustment in the required position.

The present invention offers a means of surmounting all these disadvantages and is based on effecting the securing of the welds by cross pieces welded on edgewise which span the welded joint without however actually coming into contact with the weld itself. Such cross pieces have the advantage in general that they can be manufactured by straight cuts. The machining can be effected in a cheap manner, for example on a planing machine which supplies a large number of plates at the same time while a further adjustment to the curvature of the tube or other body becomes unnecessary in the spanning of welds, on account of the smallness of the contact surface.

Two such methods of execution are illustrated in the accompanying drawing, in which Figs. 1 an 2 are a side elevation and an end view, respectively, illustrating the invention as applied to a butt weld of two axially alined pipe sections, and Figs. 3 and 4 are similar side and end views, respectively, illustrating the invention as applied to a butt weld of two intersecting pipe sections.

In the drawings, $a$ and $a^1$ are the weld seams to be secured, $b$ and $b^1$ are the cross pieces which secure the weld seams and are employed in any desired number.

I claim:—

1. The process of reinforcing a welded annular joint between two bodies which comprises arranging reinforcing strips in the form of thin plates across and edgewise to the joint, said reinforcing strips being out of contact with the weld between said bodies and welding edges of the strips to the said bodies at opposite sides of said annular joint.

2. A reinforced welded annular joint between two bodies comprising material deposited at the adjacent opposed surfaces of said bodies to constitute a primary annular weld therebetween and thin plates presented edgewise to said bodies and so shaped as to extend over and out of contact with said weld, the said plates being welded to said bodies at opposite sides of said primary annular weld.

3. The process of reinforcing a welded annular joint between two pipes both welded axially to each other, which comprises arranging reinforcing strips in the form of plates across and edgewise to the joint, said reinforcing strips being out of contact with the weld between said pipes and welding edges of strips to the said pipes at opposite sides of said annular joint.

4. A reinforced welded annular joint between two pipes both welded axially to each other comprising material deposited at the adjacent opposed surfaces of said pipes to constitute a primary weld therebetween and thin plates presented edgewise to said pipes and so shaped as to extend over and out of contact with said weld, the said plates being welded to said pipes at opposite sides of said primary annular weld.

In testimony whereof I have hereunto set my hand.

ARTUR LÜTZOW.